June 16, 1964  D. E. SEYMOUR ETAL  3,137,746
METHOD OF PRODUCING NON-WOVEN FABRICS FROM THERMOPLASTIC FILM
Filed July 18, 1961  2 Sheets-Sheet 1
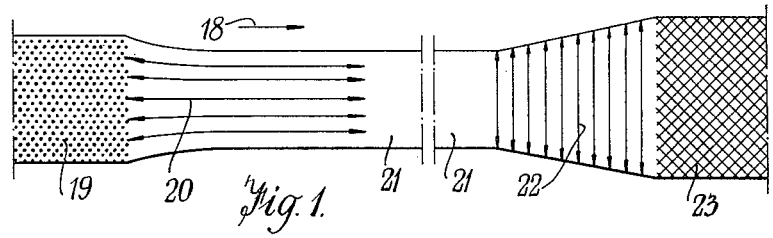
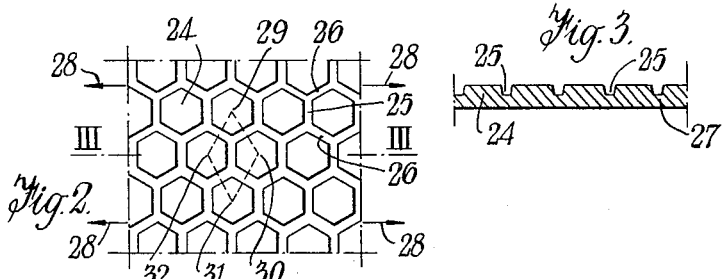
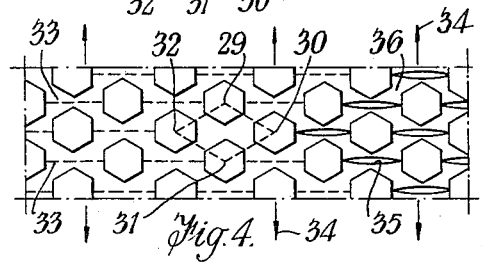
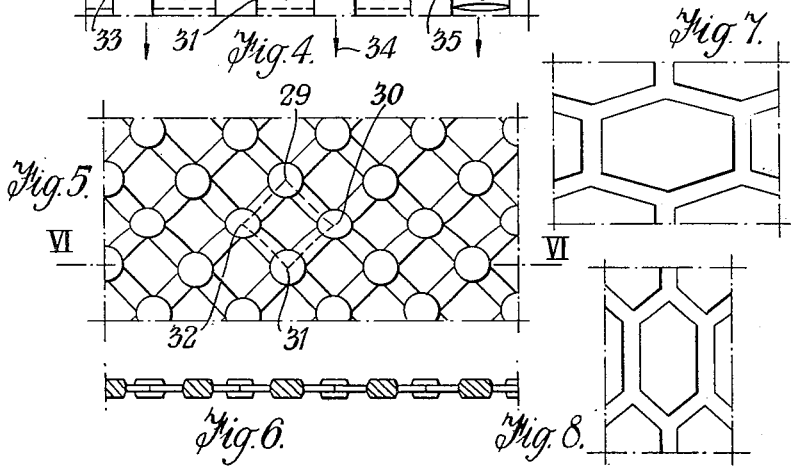
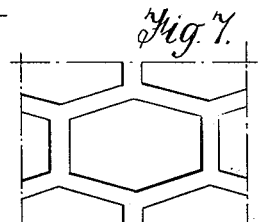
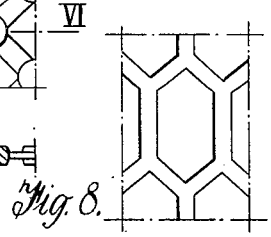

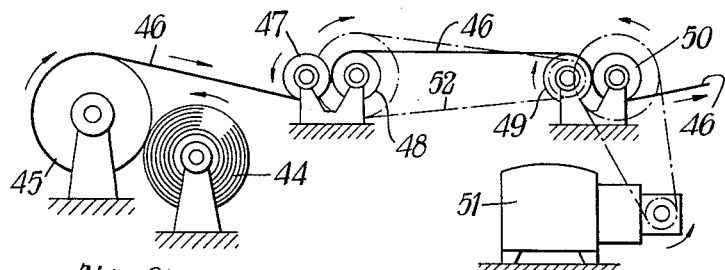
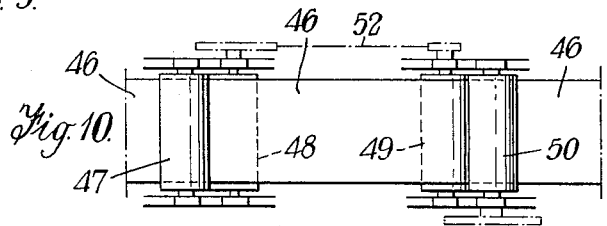
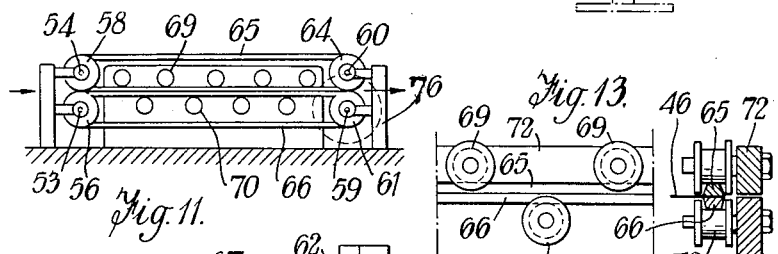
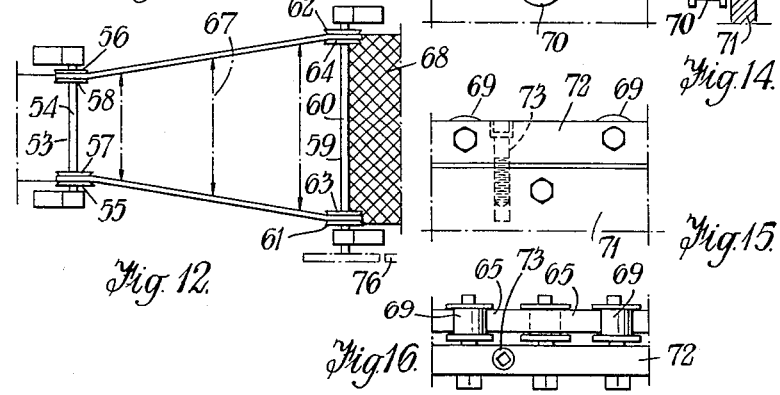

United States Patent Office 3,137,746
Patented June 16, 1964

3,137,746
METHOD OF PRODUCING NON-WOVEN FABRICS FROM THERMOPLASTIC FILM
Donald Edwin Seymour and David James Ketteridge, Welwyn Garden City, England, assignors to Smith & Nephew Research Limited, Hertfordshire, England, a British company
Filed July 18, 1961, Ser. No. 125,014
Claims priority, application Great Britain July 18, 1960
4 Claims. (Cl. 264—73)

This invention relates to the production of openwork net fabrics which resemble woven fabrics but are not woven, from thermoplastic material having a long chain molecular structure such, for instance, as polymers of the olefine group including ethylene and propylene, and co-polymers thereof in any suitable blend, such for example as high-density or medium-density linear polyethylene and ethylene/proylene copolymer; and has for its object to produce such openwork net fabrics from films of such material in a simple and efficient manner.

The method, according to the present invention, of producing openwork net fabrics from films of thermoplastic material as set out above comprises: (a) forming at least one surface as an embossed surface, the embossments being solid bosses or raised figures preferably of hexagonal shape arranged, with spaces between adjacent hexagons, in parallel rows in the longiutdinal direction of the film and with two parallel flat edges of each of the hexagons in the transverse direction of the film, the parallel longi-tudinal rows of hexagons being arranged so that the centres of every four adjacent hexagons are at the angular corners of a rhombus with obtuse angles aligned longi-tudinally of the film and acute angles transversely of the film, (b) stretching the embossed film at a desired rate in its longitudinal direction until it takes a permanent set, to remain in the stretched condition, (c) and then subjecting the permanently stretched film to a transverse stretching, which has the effect of splitting the film with a multiplicity of short splits through the material thereof, which splits extend in the longitudinal direction between longitudinally aligned bosses of each longitudinal row, so that the splits of one longitudinal row pass through the spaces between the transversely adjacent hexagons of the two adjacent rows, to leave each hexagonal boss of a row with four thinned narrow bands of the partly elongated material in-tegral therewith and extending from the flat edges which are not transverse to the film, two of which bands are con-nected to the two adjacent hexagonal bosses in the adja-cent longitudinal row above, and two bands to the two ad-jacent hexagonal bosses in the adjacent longitudinal row beneath.

This gives a net formation, when the transverse stretch is complete, having the bosses located at the intersections of the net and actually projecting slightly from each sur-face of the fabric thus formed.

The original longitudinal splits in the stretched material appear to be due to the orientation of the material be-tween the bosses and would extend for the full length of the stretched film, if the raised bosses were not present to break the line, but owing to the presence of the bosses the extent of the splitting when the transverse stretch is applied to any transverse zone, is in the material between the bosses of more or less longitudinally aligned bosses in the rows which are located in said zone.

In order that the invention may be better understood, it will now be described with reference to the accompany-ing somewhat diagrammatic drawings which are given by way of example only and in which:

FIG. 1 is a diagrammatic view of a strip of material constructed according to the invention, laid flat and illus-trating from end to end the various stages of manufacture.

FIG. 2 is a greatly enlarged plan view of a portion of a sheet of thermoplastic material according to the invention, having the upper surface with parallel rows of similar projections of regular hexagonal form, in a particular ar-rangement to be hereafter described, and the lower surface flat.

FIG. 3 is a section on the line III—III, FIG. 2 (en-larged, in so far as the thickness is concerned, to a much greater scale than the enlargement of FIG. 2).

FIG. 4 is a similar view to FIG. 3, but showing the ma-terial after it has passed through the first stage of the process.

FIG. 5 is a similar view to FIGS. 2 and 4 but showing the material after it has passed through the next stage to that shown in FIG. 4.

FIG. 6 is a cross-section on the line VI—VI, FIG. 5, to an enlarged scale similar to FIG. 3.

FIGS. 7 and 8 illustrate other hexagonal forms of the projections.

FIG. 9 is a diagrammatic side elevation of an apparatus for carrying out the first stretching step of the process ac-cording to the invention.

FIG. 10 is a part plan of FIG. 9.

FIG. 11 is a diagrammatic side elevation of an apparatus for carrying out the second stretching stage of the process according to the invention.

FIG. 12 is a plan view of FIG. 11.

FIGS. 13 to 16 show mechanical details of the appara-tus shown in FIGS. 11 and 12 to a much larger scale, to illustrate the clamping action for the second stretching stage of the process according to the invention, FIG. 13 being a fragmentary front elevation from the interior of the apparatus, FIG. 14 an end view of FIG. 13, FIG. 15 a fragmentary elevation from the exterior of the apparatus, and FIG. 16 a plan.

FIG. 1 represents the material in strip form for a con-tinuous process to produce the net according to the inven-tion, and is merely to illustrate the various steps of the process. In this process the material moves through the necessary apparatus in the direction of the arrow 18, and at the start this material has the projections 19 thereon. The material passes through the first stretching process in the longitudinal direction of the strip represented by the arrows 20 and in the zone of these arrows. After this the material at 21 which is in the state after the first stretching, can be rolled up to pass to another mechanism or appara-tus for the second stretching or where, as is preferred, this second apparatus is in one with the first, the longitudinal-ly stretched material 21 then passes to the second appara-tus where it is given the second stretching operation in the transverse direction represented by the arrows 22. This operation is similar to the stentering operation as utilised in treating certain types of textile fabric. After passing through this second stretching operation, the net 23 is formed, which can be rolled on a take-up roller.

For reasons to be set out hereafter, each projection 24 preferably is a regular hexagon as shown, and all these hexagons are similar and their rows are so arranged that two flat surfaces of each of the adjacent hexagons in a row, are transverse to the length of the material.

In the longitudinal direction the hexagons are arranged at a certain pitch and this pitch leaves spaces 25 between adjacent hexagons 24 of that row. The next adjacent row on each side of the first row is similarly arranged to the first-mentioned row, but these two adjacent rows have the hexagon in the longitudinal direction of the strip in the mid-positions of the hexagon of the first-mentioned row so that spaces 26 of the same width as the spaces 25 are left between the adjacent faces of the hexagons but, as will be seen, these adjacent faces are angularly arranged transversely.

The spaces 25 and 26 between the hexagons pass through approximately half the thickness of the strip, leaving the projections 24 between the spaces, and thin narrow parts of the strip 27 beneath the spaces 25 and 26.

In a particular case the total thickness of the strip is 0.003″, and the hexagons have a pitch of approximately 60 to the inch, the spaces 25 and 26 having a width of 0.0015″.

It should be observed that with the rows of hexagons arranged as described, each four adjacent hexagons have their centres at the angular points 29, 30, 31 and 32 of a regular rhombus. When the first stretching operation takes place, that is to say, when the material is subjected to a pull in the longitudinal direction represented by the arrows 28, FIG. 2, then upon this continuing until the material takes a permanent set, each rhombus is changed so that the angular points 29 and 31 come closer together whilst the angular points 30 and 32 come wider apart. This is illustrated by the one rhombus shown in FIG. 4.

In this condition of the material, the thin material 27 below the spaces 25 is sufficiently stretched to have taken a permanent set as the adjacent flat surfaces which are transverse to the length of the strip, of adjacent projections in the rows, have been drawn a sufficient distance apart for this purpose, whilst the thin material 27 below the spaces 26 is stretched to a lesser extent, for instance approximately half the extent, as the adjacent flat surfaces which are at an angle to the length of the strip, of adjacent projections of the differing rows, have been drawn apart only approximately half the said distance.

When the material of the strip which is in the condition shown in FIG. 4, is subsequently subjected to the second stretching operation which is transverse to the length of the strip, then the fully stretched thin material beneath the spaces 25 is given a multiplicity of splits, that is, one for each space, between the adjacent flat surfaces which are transverse to the length of the strip and some of which are represented by the dotted lines 33, FIG. 4. However, the lesser-stretched material of the thin portion 27 beneath the spaces 26 is not split but remains attached to the angularly arranged adjacent surfaces of the hexagons of the adjacent rows so that when the transverse stretching represented by the arrows 34, FIG. 4, is completed, the material assumes the appearance shown in FIG. 5, the rhombus 29, 30, 31, 32 again being expanded and taking up the position shown in FIG. 5. Also, in FIG. 5 the hexagons have been represented by circles as they lose their distinctive shape somewhat in the two stretchings, and slight projections also appear on the under surface.

More fully to appreciate the action, towards the right-hand side of FIG. 4 some of the splits 33 have been represented by openings 35 and the unsplit material beneath the spaces 26 by bands 36. When the material has been expanded to the condition shown in FIG. 5, it is these bands 36 which constitute the four connecting bands of the net to and between the projections.

In place of regular hexagons, other forms of hexagon may be utilised, provided these irregular hexagons are symmetrical about two axes. For example, as shown in FIG. 7, the axis of the hexagon in the longitudinal direction of the strip is elongated beyond that of a regular hexagon, whilst in FIG. 8 it is shortened. However, to give a symmetrical diamond-like pattern, obviously the best practical form is the regular hexagonal form and the half-staggering of the pitch between adjacent longitudinal rows of the hexagons. Again, in some cases if desired in place of actual hexagonal shapes, approximations thereto can be utilised; for example, circular projections, possibly with hexagonal "flats" in the requisite positions, or projections of elliptical form with "flats" in appropriate places.

The first operation may be carried into effect as indicated in FIGS. 9 and 10 where 44 is a roll of the material with the hexagonal projections on one surface, which is kept pressed against a take-off roller 45 so that the strip 46 passes from the roller 45 to a pair of nipping rollers 47, 48 one of which, 47, is of rubber and the other, 48, which may be hollow and warmed, is of metal.

The material 46, for its first stretching operation, passes from the nipping rollers 47, 48 to another pair of nipping rollers 49, 50 one of which, 49, is of rubber and the other, 50, of metal.

The roller 50 is driven from a motor 51 and drives the roller 49, which is equal in diameter to and geared to the roller 48 of the front pair of nipping rollers by a chain drive 52.

The gearing is a 3:1 gearing so that the linear speed of the roller 49 is three times that of the roller 48. As a consequence, the material of the strip 46 is given its first stretching in the zone between the two pairs of nipping rollers.

The second stretching operation may be carried out as indicated in FIGS. 11 to 16. In FIGS. 11 and 12 there are two horizontal spindles 53 and 54, one above the other, carried by suitable bearings. The spindle 53 has two V-grooved pulleys 55 and 56 thereon, and the spindle 54 has two similar V-grooved pulleys 57 and 58 thereon. The pulleys 55 and 56 come below the corresponding pulleys 57, 58.

Spaced from the spindles 53, 54, similarly supported and parallel thereto, are further horizontal spindles 59, 60, the spindle 59 having V-grooved pulleys 61 and 62, and the spindle 60 other corresponding V-grooved pulleys 63 and 64.

A flat-topped truncated V-section belt 65 passes around the pulleys 58 and 64, another similar belt 66 around the pulleys 56 and 61, and the lower run of the belt 65 and the upper run of the belt 66 pass along in contact as shown in FIG. 12. Similarly, there are two belts at the front, connecting the pulleys 57, 63 and 55, 61, these belts having portions of their lower and upper runs respectively in contact.

In plan, as seen in FIG. 12, the pairs of belts diverge towards the right hand, and the spacing of the common runs of the belts to the left hand of FIGS. 11 and 12 is suitable for the strip 46 of the material, after its first stretching, to be entered by its edges between the two belts at the front of the apparatus and the two belts at the rear. These edges are tightly gripped as hereafter explained, and the grips on the material, by the drive of the spindle 61 from the motor-driven gear-wheel 76, cause the material to be drawn through the machine and given the second stretching in the direction of the arrows 67, to form the net 68.

The runs of the belt at the front and the rear which are in contact and which carry along the edges of the strip, are held in a clamping-like grip by upper clamping rollers 69 and lower clamping rollers 70. These are generally indicated in FIG. 11 and shown in greater detail in FIGS. 13 to 16.

Just on the inside of the belts in the two positions there is a bearing wall 71 which in a number of spaced positions has borings for the spindles of the lower clamping rollers 70. These, as indicated in FIG. 14, form supports for the smaller portion of the V belt 66, leaving its larger surface to grip the edge of the material 46.

In collaboration with each of these bearing walls there is a clamping bar 72 which also has borings for the spindles of the upper clamping rollers 69, the rollers of which come on the upper narrower sides of the upper belt 65, the wider surface of which collaborates in the gripping of the strip 46.

The clamping bars 72 are in adjustable screwed connection with the bearing walls 71, as indicated in FIGS. 15 and 16. That is to say, at spaced intervals the clamping bar has recesses for clamping screws 73 the lower ends of which adjustably engage in tapped bores in the upper edge of the bearing wall 71. In this manner, throughout the lengths of the clamping bars the various screws thereof can be adjusted so that there is an effective clamping action of the whole of the edge of the strip of material as it passes through the machine, whereby the clamping action on each edge of the strip, by the diverging of the belts, sets up the second stretching action to form the net.

In experimental methods of carrying the invention into effect utilising apparatus as indicated in FIGS. 9 to 16, and with material as shown in FIGS. 2 and 3, a sheet of high density linear polyethylene is employed, formed by extrusion from a flat die with a gap 0.015" wide, drawn down to a thickness of approximately 0.003" (film weight 67 g./m.$^2$) before embossing on one side with bosses of hexagonal shape.

The embossing is effected by including an embossing roller in the chill-roll take-off unit, so that the hot extrudate is trapped between the embossing roller and the chill-roll a few inches from the lips of the die.

The embossing roller carries the rhombic pattern of hexagons as described in relation to FIG. 2; in the example being particularly described, there are approximately 3600 hexagons per square inch.

With this method and these dimensions, from an embossed film of 12" width, in practice an openwork net fabric of approximately 14" width has been produced with a square mesh pattern having dimensions depending on the degree of longitudinal stretch; for example, 1500 diamonds or squares per square inch are obtained if the embossed film is longitudinally stretched 100% (net weight 28 g./m.$^2$), and 1000 diamonds or squares per square inch are obtained if the embossed film is longitudinally stretched 200% (net weight 19 g./m.$^2$).

In using the method according to the present invention to form a net with very small holes, the arrangement must be such that only a small degree of longitudinal stretch is necessary to cause a permanent set. As a consequence, the slits between adjacent embossments are very short and the resulting holes are very short and only small holes are formed in the net structure. The pitch of the embossments can be as required, for example 60 to the inch as before described.

In certain cases what can be regarded as a "porous film" can be produced by the method of the invention. For this purpose the embossments could be small and very close and have a pitch of several hundreds to the inch. In this manner there could be up to 300 embossments per square inch, as it is possible in commerce at present to procure embossing rollers for such small and closely spaced embossments.

Even with only 150 to the inch, there would be over 20,000 very small uniformly spaced holes or pores per square inch through the film which, of course, would be of commensurate thinness, for example 0.00025".

As a contrast, the spacing of the embossments could be relatively large, for example ¼", giving 16 to the square inch, and the thickness of the film would be commensurate and, for example, ⅟₁₆" or more.

The thermoplastic material employed can, if desired, include a suitable proportion of fillers and/or colouring matter, as well as stabilisers and otherwise, to produce a commercial openwork fabric, it, however, being understood that only such additions and quantities thereof can be employed which will be compatible with carrying the process of the invention into effect.

The original embossed material in some cases may have embossments on both surfaces, the bosses on one face being preferably in axial alignment (through the thickness of the material) with the bosses on the other face. In some cases, with the bosses on one face, the other face could have a raised pattern disposed so that it would follow the lines, or some of the lines, of the net to be produced, in order to reinforce the said net.

Although the spacing between the transverse rows of bosses can be uniform, in some instances this spacing can be varied within a certain range, for example for assisting in the formation of patterns in the net of the fabric produced. Similarly, the spacing between the longitudinally extending rows of bosses can be uniform, but here again this spacing can be varied within limits. Patterns can also be obtained by treating (locally) the longitudinally stretched film, before the second stretching operation.

In combination with such varied spacings of the rows of bosses, the size of the bosses, that is, their projected area in plan, can be varied within limits, or this variation could be used alone.

An apparatus for carrying the method of the invention into effect as a continuous process, can start with the embossed sheet material of desired width from a roll, or include an extruding, calendering or casting first stage, followed by the embossing of the material, preferably while still hot.

It will be obvious that the invention is not limited to the method of transverse stretching or stentering herein particularly described, as other stentering devices may be used which, while the feed continues, expand the material laterally so that its lateral edges are drawn apart.

In some cases the expansion can be by a species of pressing or stamping operation whereby a convex shaped former co-operating with a concave die gradually "draws" the material to cause the expansion and form the net.

In certain instances, this action can be utilised to expand only some portions of the longitudinally stressed material so that the final product includes expanded portions and unexpanded portions. In such cases the expanded portions if necessary could have a concavo-convex formation.

Where required, before the final take-up roller or other means for collecting the finished product, the openwork net fabric may have a setting or what may be termed a "normalising" treatment. This setting or normalising treatment may comprise heating for a short period at relatively low temperature (in relation to the fusing temperature of the material) to remove or reduce any stresses set up in the material due to the longitudinal stretching. This would be particularly advantageous in the case where the transverse stretching is only given to certain parts of the longitudinally stretched film, as it would fix the area and shape.

Where the thermoplastic material already exists in the unembossed sheet form, for example wound on a roller, as a first step in a process according to the invention the film can pass to a heating zone for a softening before being embossed, and the embossing could take place under heat at a temperature depending upon the precise nature of the material.

For pattern purposes, the embossed film may be mass printed in desired colours on one or both surfaces, the coloured masses having such areas and being so disposed that a desired pattern is given to the openwork net fabric produced.

Again, if desired, the embossed film may be a laminate, for example of two thicknesses of the same thermoplastic material, but of different colours, which have been bonded together and subsequently embossed, preferably under heat conditions. The resulting product, after such laminate passes through the process according to the invention, will be a variegated two-colour openwork net fabric.

If desired, as well as the normalising treatment, or as a treatment on its own, the net produced can be sprayed or dipped for reinforcement, heat-sealing or contact adhesion.

The invention is not limited to the precise forms or details herein described, as these may be varied to suit particular requirements.

What we claim is:
1. A method for the production of openwork net fab- rics which resemble woven fabrics, from a film of thermoplastic material having a long chain molecular structure with one surface at least formed as an embossed surface of small solid bosses or raised figures arranged with spaces between adjacent bosses in longitudinal and transverse rows, the row of bosses in each longitudinal row being in staggered arrangement with the row of bosses on each adjacent row, comprising stretching the embossed film at a desired rate in its longitudinal direction until it takes a permanent set, to remain in the stretched condition, and then subjecting the permanently stretched film to a transverse stretching, which has the effect of splitting the film with a multiplicity of short splits through the material thereof, which splits extend in the longitudinal direction between longitudinally aligned bosses of each longitudinal row, so that the splits of one longitudinal row pass through the spaces between the transversely adjacent bosses of the two adjacent longitudinal rows, to leave each boss of a longitudinal row with four thinned narrow bands of the partly elongated material integral therewith and extending therefrom, each of these four bands being integral with and extending from an adjacent boss in the two adjacent longitudinal rows of bosses.

2. Methods for the production of openwork net fabrics as claimed in claim 1, in which the starting material is formed from laminations of the same thermoplastic material of long chain molecular structure, but of differing colours, which have been bonded together and subsequently embossed, in order to form a vari-coloured openwork net fabric.

3. A method for the production of openwork net fabrics which resemble woven fabrics, from a film of thermoplastic material having a long chain molecular structure, comprising the steps of: (a) forming at least one surface as an embossed surface, the embossments being solid bosses or raised figures of hexagonal shape arranged, with spaces between adjacent hexagons, in parallel rows in the longitudinal direction of the film and with two parallel flat edges of each of the hexagons in the transverse direction of the film, the parallel longitudinal rows of hexagons being arranged so that the centres of every four adjacent hexagons are at the angular corners of a rhombus with obtuse angles aligned longitudinally of the film and acute angles transversely of the film, (b) stretching the embossed film at a desired rate in its longitudinal direction until it takes a permanent set, to remain in the stretched condition, (c) and then subjecting the permanently stretched film to a transverse stretching, which has the effect of splitting the film with a multiplicity of short splits through the material thereof, which splits extend in the longitudinal direction between longitudinally aligned bosses of each longitudinal row, so that the splits of one longitudinal row pass through the spaces between the transversely adjacent hexagons of the two adjacent rows, to leave each hexagonal boss of a row with four thinned narrow bands of the partly elongated material integral therewith, two of which bands are connected to the two adjacent hexagonal bosses in one adjacent longitudinal row, and two bands to the two adjacent hexagonal bosses in the other adjacent longitudinal row.

4. A method for the production of openwork net fabrics as claimed in claim 3, in which one face of the film has the embossed and spaced rows of projections, and the other has a raised pattern disposed so that it follows at least some of the lines of the net to be produced, to reinforce such net.

References Cited in the file of this patent

UNITED STATES PATENTS

| | | |
|---|---|---|
| 2,294,966 | Dreyfus | Sept. 8, 1942 |
| 2,361,369 | Grebe et al. | Oct. 31, 1944 |
| 2,442,757 | Cloud | June 8, 1948 |
| 2,582,777 | Grozinger | Jan. 15, 1952 |
| 2,957,200 | Piefahl | Oct. 25, 1960 |